P. H. SWEET.
GIN OR LINTER SAW.
APPLICATION FILED FEB. 18, 1919.
1,353,435.
Patented Sept. 21, 1920.
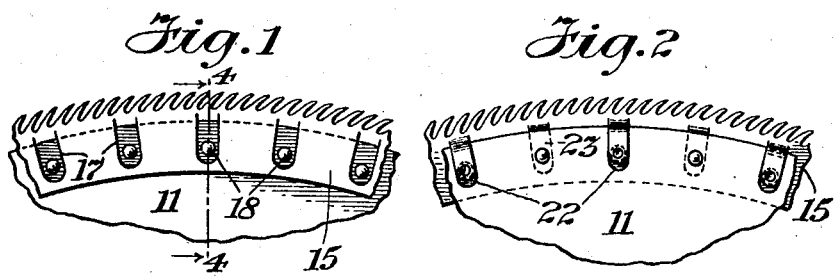
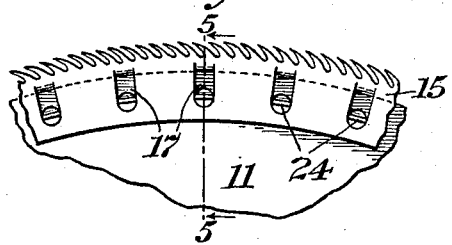
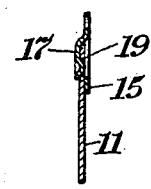
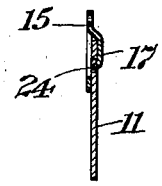
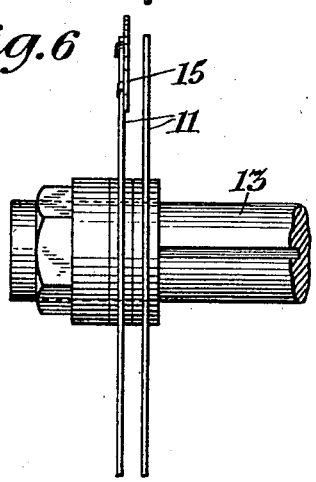
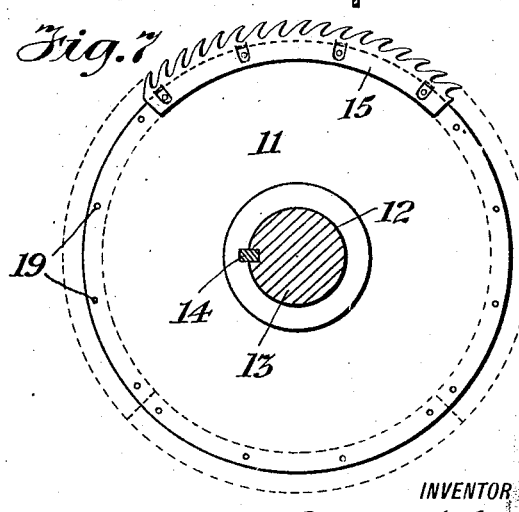
INVENTOR
Parker H. Sweet
BY
John O. Seifert
HIS ATTORNEY

UNITED STATES PATENT OFFICE.

PARKER H. SWEET, OF BOONTON, NEW JERSEY, ASSIGNOR TO THE BARKER-SWEET MANUFACTURING COMPANY, OF JAMAICA, NEW YORK, A CORPORATION OF NEW YORK.

GIN OR LINTER SAW.

1,353,435.

Specification of Letters Patent.   Patented Sept. 21, 1920.

Original application filed June 10, 1918, Serial No. 239,124. Divided and this application filed February 18, 1919. Serial No. 277,730.

*To all whom it may concern:*

Be it known that I, PARKER H. SWEET, a citizen of the United States, and a resident of Boonton, in the county of Morris and State of New Jersey, have invented new and useful Improvements in Gin or Linter Saws, of which the following is a specification.

This invention relates to gin or linter saws. Gin or linter saws consist of disks having teeth at the peripheral edge and a plurality of disks mounted upon a revoluble shaft in juxtaposed and spaced relation. Should the saw teeth be formed directly upon the disks in order to sharpen the teeth, or to renew saws the teeth of which have been broken, it is necessary to remove the saw carrying shaft from its bearings, remove the saws from the shaft and again assemble them on the shaft.

It is the object of the present invention to overcome the necessity of removing the saw carrying shaft and then the saws from the shaft when it is desired to sharpen the teeth of a saw or saws or to substitute one saw for another the teeth of which have been broken.

In carrying out the invention I provide circular members or disks and mount the same upon a shaft, which may be done in a manner similar as has heretofore been the practice in the mounting of such saws, but instead of forming the teeth directly upon the disks toothed annular or circular members or bands are removably connected to the peripheral portion of the disks, and it is a further object of the invention to provide improved means which are novel and simple in construction to releasably secure the toothed members to the circular members or disks, the present application being a division of my co-pending application filed June 10th, 1918, Serial No. 239,124.

In the drawing accompanying and forming a part of this specification, Figure 1 is a side elevation of a peripheral portion of a gin or linter saw showing an embodiment of my invention.

Figs. 2 and 3 are views similar to Fig. 1 showing modified forms of the invention.

Fig. 4 is a cross sectional view taken on the lines 4—4 of Fig. 1 looking in the direction of the arrows.

Fig. 5 is a cross sectional view taken on the lines 5—5 of Fig. 3 looking in the direction of the arrows.

Fig. 6 is a side elevation of a gin or linter saw showing in a general way the application of my invention.

Fig. 7 is is an elevational view of a portion of a saw cylinder of a cotton gin to show the manner of mounting the saw carriers thereon.

Similar characters of reference designate like parts throughout the different views of the drawing.

In the embodiment of my invention shown in the drawing I provide a circular member or disk 11 having a central opening 12 for the engagement of a shaft 13 upon which the disk is mounted to rotate therewith as by a key 14. In the general application of the invention a series of these disks are mounted upon the shaft in juxtaposed and spaced relation. Removably secured to the peripheral portion of the disk are circular members or bands 15 having teeth formed on the outer edge, these bands preferably being in sections or segments, as shown in Fig. 6 and forming an annular toothed blade when secured to the disk.

To releasably secure the toothed sections to the disks, as shown in Figs. 1 and 4, and which may be the preferred form, circumferentially disposed and equidistantly spaced openings 19 are provided in the peripheral portion of the disk 11. Clips or tongues 17 are stamped from the body of the toothed bands, said clips extending transversely of the body of the band and are bent to extend laterally from the band and form a shoulder at the juncture of the clips with the body of the band. A nib 18 adjacent the free ends of the clips is pressed from the metal of the clips to form a protuberance to extend in a direction toward the body of the band, as clearly shown in Fig. 4, and the clips are so arranged that the nibs will engage in openings 19 in the disk. The toothed bands are made of resilient material, and the clips 17 are so arranged that the free ends will tend to spring toward the body of the band and are spaced therefrom so that said space will be slightly less than the thickness of the disk. The bands are applied to the disk by a radial movement, the clips giving sufficient to permit of the inserting of the disk between the nibs and body of the band, and as the clip nibs come in register with the disk openings 19 they will spring into such openings and firmly though releasably retain the band on the disk. It will be obvious that the bands 15 may be removed by a radial pull.

The embodiment shown in Fig. 2, is similar to that shown in Fig. 1. However, instead of all of the clips extending laterally from one side of the band only alternate clips or tongues as shown at 22 extend laterally from the band, the tongues 23 alternating with the tongues 22, being stamped from the band and extending therefrom slightly in a direction toward the tongues 22, whereby the clips 22 embrace one side of the disks while the body of the band and the clips 23 embrace the opposite side. The tongues 22 and 23 also have nibs or protuberances to engage the openings 19 in the disk 11 to releasably secure the toothed band to the disk.

The embodiment shown in Figs. 3 and 5 is similar to that shown in Fig. 1, but instead of the tongues or clips 17 being provided with the protuberances to engage in the disk openings 19, the ends of the clips are bent up to form a flange 24 to engage in the disk openings to releasably retain the toothed band on the disk.

Having thus described my invention, I claim:

1. In gin or linter saws, the combination of a disk having circumferentially disposed openings adjacent the periphery; a band of circular form having teeth on the outer edge; clips stamped from the band to extend laterally therefrom and in a direction transversely of the band, and between which clips and the body of the band the peripheral portion of the disk is adapted to engage; and nibs formed on the clips to engage in the disk openings for the purpose specified.

2. In gin or linter saws, the combination of a disk having circumferentially disposed openings adjacent the periphery; a band of circular form having teeth formed on the outer edge; clips stamped from the band to extend in a direction transversely of the band and alternate clips to extend laterally from the band, and between which laterally extending clips and the body of the band the peripheral portion of the disk engages; and nibs formed on the clips to extend in a direction toward the body of the band to engage in the openings in the disk for the purpose specified.

3. In gin or linter saws, a curved band having teeth formed on the outer edge, and clips stamped from the band to extend transversely of and laterally from the band, and arranged to clamp the band to a carrier for the band engaging between the band and clips.

4. In gin or linter saws, a curved band having teeth formed on the outer edge, and clips stamped from the band to extend transversely thereof and alternate clips to extend laterally from the band and the respective clips arranged with inwardly projecting nibs for the purpose specified.

PARKER H. SWEET.